United States Patent
Fleming (10) Patent No.: US 9,463,421 B2
(45) Date of Patent: Oct. 11, 2016

(54) PLANAR FILTRATION AND SELECTIVE ISOLATION AND RECOVERY DEVICE

(71) Applicant: LOCKHEED MARTIN CORPORATION, Bethesda, MD (US)

(72) Inventor: Shawn P. Fleming, Mount Laurel, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 13/803,958

(22) Filed: Mar. 14, 2013

(65) Prior Publication Data

US 2013/0256210 A1    Oct. 3, 2013

Related U.S. Application Data

(60) Provisional application No. 61/617,261, filed on Mar. 29, 2012.

(51) Int. Cl.

| | |
|---|---|
| B01D 71/02 | (2006.01) |
| B01D 65/02 | (2006.01) |
| B01D 63/08 | (2006.01) |
| B01D 65/08 | (2006.01) |
| C02F 1/44 | (2006.01) |
| C02F 1/46 | (2006.01) |
| C02F 103/08 | (2006.01) |

(52) U.S. Cl.
CPC ........... *B01D 71/021* (2013.01); *B01D 63/082* (2013.01); *B01D 65/022* (2013.01); *B01D 65/08* (2013.01); *C02F 1/44* (2013.01); *B01D 2319/022* (2013.01); *B01D 2319/06* (2013.01); *B01D 2321/22* (2013.01); *C02F 1/4602* (2013.01); *C02F 2103/08* (2013.01)

(58) Field of Classification Search
CPC .......... B01D 63/082; B01D 2319/022; B01D 2319/06; C02F 2103/08
USPC .......................... 210/321.69, 321.71, 321.75
See application file for complete search history.

(56) References Cited

U.S. PATENT DOCUMENTS

| | | |
|---|---|---|
| 4,277,344 A | 7/1981 | Cadotte |
| 4,855,058 A | 8/1989 | Holland et al. |

(Continued)

FOREIGN PATENT DOCUMENTS

| | | |
|---|---|---|
| CN | 1128501 A | 8/1996 |
| CN | 101428198 A | 5/2009 |

(Continued)

OTHER PUBLICATIONS

Israelachvili, Jacob N., Intermolecular and Surface Forces, 3rd ed., Chap.7.1 Sizes of Atoms, Molecules, and Ions, 2011, 1 page.*

(Continued)

*Primary Examiner* — Bobby Ramdhanie
*Assistant Examiner* — Patrick Orme
(74) *Attorney, Agent, or Firm* — Lathrop & Gage LLP (57) ABSTRACT

A filtration and selective fluidic recovery device comprises a housing having an inlet and an outlet. The housing has an opening extending from the inlet to the outlet and an internal support structure maintained in the opening. At least one planar filtration media is carried by the internal support structure where the media separates feedwater received at the inlet into at least a permeate and a concentrate that separately exit at the outlet.

16 Claims, 5 Drawing Sheets

(56) References Cited

U.S. PATENT DOCUMENTS

| | | | |
|---|---|---|---|
| 4,880,440 A * | 11/1989 | Perrin | 95/47 |
| 4,889,626 A | 12/1989 | Browne | |
| 5,679,249 A * | 10/1997 | Fendya et al. | 210/321.63 |
| 5,925,247 A | 7/1999 | Huebbel | 210/321.75 |
| 7,014,829 B2 | 3/2006 | Yanagisawa et al. | 423/447.1 |
| 8,147,599 B2 | 4/2012 | McAlister | 96/154 |
| 8,361,321 B2 | 1/2013 | Stetson et al. | |
| 9,028,663 B2 | 5/2015 | Stetson et al. | |
| 9,067,811 B1 | 6/2015 | Bennett et al. | |
| 9,095,823 B2 | 8/2015 | Fleming et al. | |
| 2007/0056894 A1 | 3/2007 | Connors | |
| 2007/0062856 A1 | 3/2007 | Pahl et al. | |
| 2009/0236295 A1 | 9/2009 | Braun et al. | |
| 2011/0041519 A1 * | 2/2011 | McAlister | 62/46.1 |
| 2011/0263912 A1 | 10/2011 | Miller et al. | |
| 2012/0048804 A1 | 3/2012 | Stetson et al. | 210/653 |
| 2012/0255899 A1 | 10/2012 | Choi et al. | 210/489 |
| 2013/0015136 A1 | 1/2013 | Bennett | |
| 2013/0100436 A1 | 4/2013 | Jackson et al. | |
| 2013/0105417 A1 | 5/2013 | Stetson et al. | |
| 2013/0240355 A1 | 9/2013 | Ho et al. | |
| 2013/0240437 A1 | 9/2013 | Rodrigues et al. | |
| 2013/0248367 A1 | 9/2013 | Stetson et al. | |
| 2013/0249147 A1 | 9/2013 | Bedworth | |
| 2013/0256211 A1 | 10/2013 | Fleming | |
| 2013/0270188 A1 | 10/2013 | Karnik et al. | |
| 2013/0277305 A1 | 10/2013 | Stetson, Jr. et al. | |
| 2014/0261999 A1 | 9/2014 | Stetson et al. | |
| 2014/0263035 A1 | 9/2014 | Stoltenberg et al. | |
| 2014/0263178 A1 | 9/2014 | Sinton et al. | |
| 2014/0272286 A1 | 9/2014 | Stoltenberg et al. | |
| 2014/0377738 A1 | 12/2014 | Bachmann et al. | |
| 2015/0075667 A1 | 3/2015 | McHugh et al. | |
| 2015/0217219 A1 | 8/2015 | Sinsabaugh et al. | |
| 2015/0218210 A1 | 8/2015 | Stetson et al. | |
| 2015/0221474 A1 | 8/2015 | Bedworth et al. | |
| 2015/0247178 A1 | 9/2015 | Mountcastle et al. | |
| 2015/0258254 A1 | 9/2015 | Simon et al. | |
| 2015/0258498 A1 | 9/2015 | Simon et al. | |
| 2015/0258502 A1 | 9/2015 | Turowski et al. | |
| 2015/0258503 A1 | 9/2015 | Sinton et al. | |
| 2015/0258525 A1 | 9/2015 | Westman et al. | |
| 2015/0268150 A1 | 9/2015 | Newkirk et al. | |
| 2015/0321147 A1 | 11/2015 | Fleming et al. | |
| 2015/0336202 A1 | 11/2015 | Bedworth et al. | |
| 2016/0009049 A1 | 1/2016 | Stoltenberg et al. | |

FOREIGN PATENT DOCUMENTS

| | | | |
|---|---|---|---|
| CN | 101489653 A | 7/2009 | |
| DE | 195 36 560 | 3/1997 | |
| DE | 102005049388 A1 | 4/2007 | |
| EP | 1 777 250 A1 | 5/2007 | C08J 7/04 |
| EP | 2 230 511 A1 | 9/2010 | G01N 33/487 |
| KR | 10-20120022164 A | 3/2012 | B01D 39/20 |
| WO | WO 95/00231 | 1/1995 | B01D 29/64 |
| WO | WO 2007/140252 A1 | 12/2007 | B01D 71/00 |
| WO | WO 2009/129984 A1 | 10/2009 | B01D 69/08 |
| WO | WO 2011/019686 A1 | 2/2011 | B01D 61/14 |
| WO | WO 2011/063458 A1 | 6/2011 | B01D 67/00 |
| WO | WO 2012/006657 A1 | 1/2012 | C01B 31/04 |
| WO | WO 2012/030368 A1 | 3/2012 | B01J 16/12 |

OTHER PUBLICATIONS

*Aquatic Biofouling Prevention by Electrically Charged Nanocomposite Polymer Thin Film Membranes;* de Lannoy et al; 2013 American Water Work Association membrane Technology Conference.

Mishra et al.; *Functionalized Graphene Sheets for Arsenic Removal and Desalination of Sea Water;* Desalination, Elsevier, Amsterdam, NL; vol. 282; Jan. 13, 2011.

Corresponding U.S. Appl. No. 13/802,896, filed Mar. 14, 2013.

International Search Report in corresponding application No. PCT/US2013/033400 mailed Jun. 28, 2013.

Written Opinion in corresponding application No. PCT/US2013/033400 mailed Jun. 28, 2013.

International Search Report in corresponding application No. PCT/US2013/033403 mailed Jun. 28, 2013.

Written Opinion in corresponding application No. PCT/US2013/033403 mailed Jun. 28, 2013.

Karan et al.; *Ultrafast Viscous Permeation of Organic Solvents Through Diamond-Like Carbon Nanosheets;* Science; vol. 335; Jan. 27, 2012; pp. 444-447.

Nair et al; *Unimpeded Permeation of Water Through Helium-Leak-tight Graphene-Based Membranes;* Science; vol. 335; Jan. 27, 2012; pp. 442-443.

Jiang et al.; *Porous Graphene as the Ultimate Membrane for Gas Separation;* Nano Letters; Sep. 23, 2009; vol. 9, No. 12; pp. 4019-4024.

Suk et al.; *Water Transport Through Ultrathin Graphene;* Journal of Physical Chemistry Letters; Apr. 30, 2010; pp. 1590-1594.

Sint et al.; *Selective Ion Passage through Functionalized Graphene Nanopores;* JACS Communications; 2008 American Chemical Society; Jun. 10, 2008; pp. 16448-16449.

Paul, Donald R.; *Creating New Types of Carbon-Based Membranes;* Science; vol. 335; Jan. 27, 2012; pp. 413-414.

Cohen-Tanugi et al.; *Water Desalination across Nanoporous Graphene;* Nano Letters; American Chemical Society; Jun. 1, 2012; pp. A-G.

Liu et al. (Jun. 19, 2008) "Graphene Oxidation: Thickness-Dependent Etching and Strong Chemical Doping," *Nano Lett.* 8:1965-1970.

Kim et al. (Mar. 1, 2010) "Fabrication and Characterization of Large-Area, Semiconducting Nanoperforated Graphene Materials," *Nano Lett.* 10:1125-1131.

"Pall Water Processing Disc-Tube Filter Technology", Pall Corporation, [retrieved on Feb. 10, 2015], retrieved from http://www.pall.com/pdfs/Fuels-and-Chemicals/Disc-Tube_Filter_Technology-DT100b.pdf.

(Sep. 2007) P.306-307 of "Modern Biotechnology" issued by East China University of Science and Technology Press, ISBN 978-7-5628-2116-8.

* cited by examiner

PLANAR FILTRATION AND SELECTIVE ISOLATION AND RECOVERY DEVICE

CROSS-REFERENCE TO RELATED APPLICATIONS

This application claims priority of U.S. Provisional Application Ser. No. 61/617,261 filed Mar. 29, 2012, which is incorporated herein by reference.

TECHNICAL FIELD

Generally, the present invention relates to filtration and selective fluidic isolation and recovery devices. Specifically, the present invention relates to a layered planar filtration and selective fluidic isolation and recovery device. More particularly, the present invention is directed to a stacked layer of materials that include at least one high-flux membrane material.

BACKGROUND ART

Currently, nearly half of the online capacity of desalinated water is achieved through a reverse osmosis filtering process. Reverse osmosis market share is growing but current reverse osmosis technology remains capital and energy intensive, with limitations in product design and performance based upon current polymer filtration membranes. The current industry standard for polymer filtration is an eight inch diameter by forty inch length spiral wound membrane with 400 to 440 square feet of active membrane area. Such devices are limited in permeability which in turn limits output water per unit area, or flux, and requires increased membrane area and operating pressures. These high membrane area requirements and operating pressures are a result of membrane resistance (that is, permeability) as well as concentration polarization, scaling, fouling, and the like. Higher flux rates can exacerbate fouling of the filtration membranes. As such, these filtration devices require frequent cleaning and ultimately replacement. The limitations in relation to the flux and associated membrane area requirements result in significant capital cost. The need for high operating pressure devices increase the energy required to operate the filtration device and which further results in degradation of the membrane due to fouling and compaction which also adds to the operating cost.

Current filtration devices for reverse osmosis utilize an eight inch diameter by forty inch length spiral wound design. Within the filtration media there are twenty to thirty-four membrane leafs which provide for an active membrane area for maximum filtration output water. Although improvements have been made in the filtration media, these are only incremental improvements and do not address the issues raised in regard to limited flux throughput or the requirement for high operating pressures.

The reverse osmosis approach to filtering and/or desalination is to employ active filtering layers utilizing polyimide components. These components may include composite materials or chemical treatments to modify the properties of the polymer. In all cases such technology utilizes solution diffusion so as to separate the feed material into a concentrate and permeate. In the reverse osmosis technology, the membranes are susceptible to fouling, scaling and compaction. These materials also have limited chemical and biological resistance with limited methods of cleaning, which in turn relates to the need for frequent replacement of the filtration devices.

Therefore, there is a need in the art for filtration devices that provide for improved flow characteristics, reduced size and weight and increased operational life. There is also a need for filtration devices to be able to be serviced by replacement of select components instead of replacing whole systems.

SUMMARY OF THE INVENTION

In light of the foregoing, it is a first aspect of the present invention to provide a planar filtration and selective isolation and recovery device.

It is another aspect of the present invention to provide a filtration or selective fluidic isolation and recovery device which comprises a housing having an inlet and an outlet, the housing having an opening extending from the inlet to the outlet, an internal support structure maintained in the opening and at least one planar filtration media carried by the internal support structure, the media separating feedwater received at the inlet into at least a permeate and a concentrate that separately exit at the outlet.

It is yet another aspect of the present invention for the above embodiment to provide at least one filtration media that comprises at least two planar channels, and at least one planar membrane disposed between the at least two planar channels, the planar membrane filtering the feedwater into the permeate and the concentrate.

It is a further aspect of the present invention for the above embodiment to provide at least one filtration media that further comprises a membrane support structure associated with each planar membrane and carried by the internal support structure, the membrane support structure being removable from the housing for cleaning, servicing or replacement.

It is still a further aspect of the present invention wherein for the above embodiment one of the at least two planar channels is a permeate spacer disposed between adjacent membrane support structures and the other of the at least two planar channels is a feed channel which has the planar membrane adjacent at least one side thereof.

A still further aspect of the present invention for the above embodiment provides for a planar membrane that is constructed from perforated graphene material.

Still another aspect of the present invention in another embodiment provides for each planar membrane disposed between an adjacent membrane structure on one side and an adjacent feed channel.

Yet another aspect of the present invention in still another embodiment provides for one of the at least three planar channels to be at least one first permeate spacer, at least one second permeate spacer, and at least one feed channel, and wherein the at least one planar membrane is at least one first perforated graphene material having apertures sized to block a first component of the feedwater, and at least one second perforated graphene membrane sized to block a second component of the feedwater.

A further aspect of the present invention for the above embodiment provides for the first perforated graphene membrane to be positioned between the feed channel and a first of the membrane support structures, wherein the second perforated graphene membrane to be positioned between the at least one first permeate spacer and a second of the membrane support structures, and wherein a first of the at least one second permeate spacer is positioned adjacent a side of the second of the membrane support structures opposite the second perforated graphene membrane.

Still a further aspect of the present invention comprises for the above embodiment an outlet cap associated with the outlet, the outlet cap having a first permeate pipe associated with the at least one first permeate spacer to collect the second component of feedwater, a second permeate pipe associated with the at least one second permeate spacer to collect components of feedwater not blocked by the first and second membranes, and a concentrate pipe associated with the feed spacer to collect the first component of feedwater.

A further aspect of the present invention in yet another embodiment comprises a switchable voltage supply, wherein the planar membrane is perforated graphene electrically conductive and connected to the switchable voltage supply to electrically charge the planar membrane to disrupt effects of concentration polarization for polarized species included in the feedwater.

An additional aspect of the present invention in a further embodiment comprises a switchable voltage supply, wherein the planar membrane receives a direct current electrical charge from the switchable voltage supply for a specified duration and is then removed for the purposes of destroying or disabling biological contaminants upon the planar membrane and/or surrounding structures.

A still further aspect of the present invention in another embodiment provides for the filtration media comprising a pair of spaced apart inner membranes, each inner membrane having an outer diameter coupled to the membrane support structure, and a permeate spacer disposed between the inner membranes, and wherein the internal support structure comprises at least one outlet conduit, wherein the at least one outlet conduit has openings adjacent the permeate spacer.

Yet a further aspect of the present invention for the above embodiment provides for the filtration media further comprising a pair of spaced apart end membranes, each end membrane having an outer diameter coupled to the membrane support structure, and another permeate spacer disposed between each adjacent end membrane and the inner membrane, and wherein the internal support structure further comprises another outlet conduit, wherein the another outlet conduit has openings adjacent the another permeate spacer.

And still another aspect of the present invention in a different embodiment includes the planar layered filtration media being configured for selective isolation and recovery of desired particulates, solutes, or analytes, as opposed to filtering out unwanted particulates, solutes, or analytes for two or more concentrate streams.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
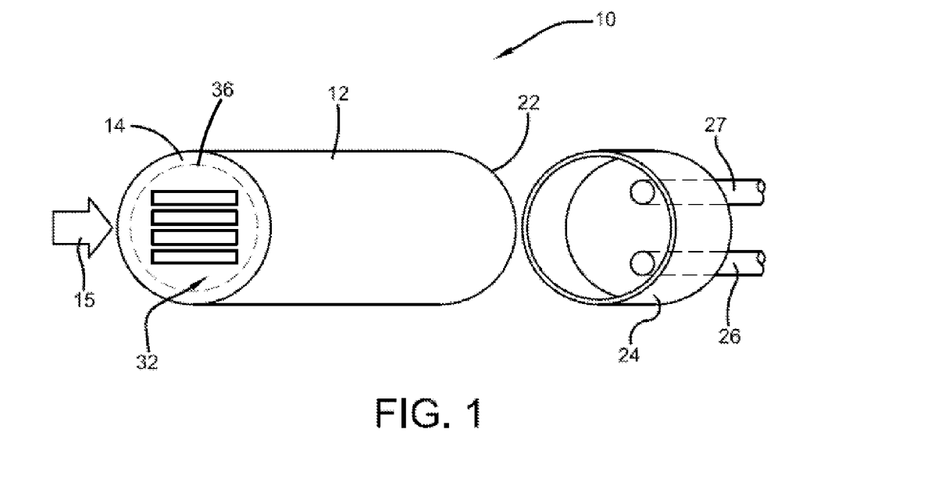
FIG. 1 is a right side enlarged perspective schematic view of a planar filtration device carried in a housing according to the concepts of the present invention.
Figure 2:
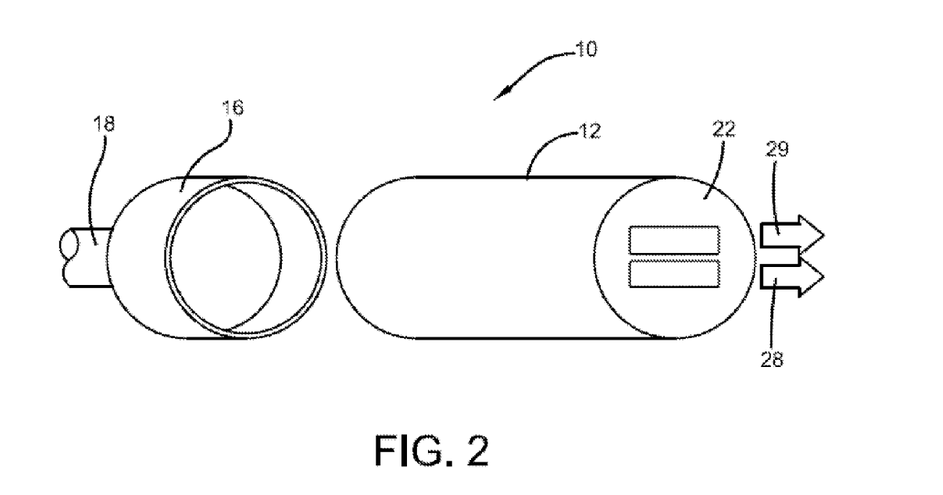
FIG. 2 is a left side enlarged perspective schematic view of the planar filtration device carried in the housing according to the concepts of the present invention.

Referring now to FIGS. 1 and 2, it can be seen that a filtration device is designated generally by the numeral 10. FIG. 1 presents a general perspective cross-sectional view of an inlet side while FIG. 2 presents a perspective general cross-sectional view of an outlet side of the filtration device. The device 10 includes a housing 12 which may be of a cylindrical construction as shown, but other shapes are believed to be possible depending upon end-use applications. In any event, the housing 12 includes an inlet 14 which receives feedwater 15 or other fluid for filtration or selective fluidic isolation and recovery. Although the term feedwater is used throughout this description, it will be appreciated that the feedwater or fluid material provided to the filtration device may not include water. As used herein, feedwater refers to the medium that includes components supplied to the filtration device for separation and removal. In another embodiment, the feedwater may contain particulates, solutes, or analytes of interest for selective fluidic isolation and recovery. Attached to the inlet 14 is an inlet cap 16 which includes a feedwater pipe 18 that allows the feedwater to be directed into the housing. As will be appreciated by skilled artisans, the inlet cap 16 directs the received feedwater 15 into a plurality of feed spacers as will be described. In some embodiments, the cap 16 may have conduits to direct the feedwater into the feed channels. In other embodiments, the feed channels may be surrounded by a non-porous surface such that the feedwater is directed into the feed channels.

An outlet 22 is disposed at an opposite end of the housing 12 and provides an outlet cap 24. The outlet cap 24 includes a permeate pipe 26 and a concentrate pipe 27. These pipes or conduits direct the filtered feedwater—a permeate 28 and a concentrate 29, sometimes called a residue—based upon their properties after filtration, for further use. The outlet cap 24 is configured to maintain the separation of the permeate from the concentrate.

Figure 3:
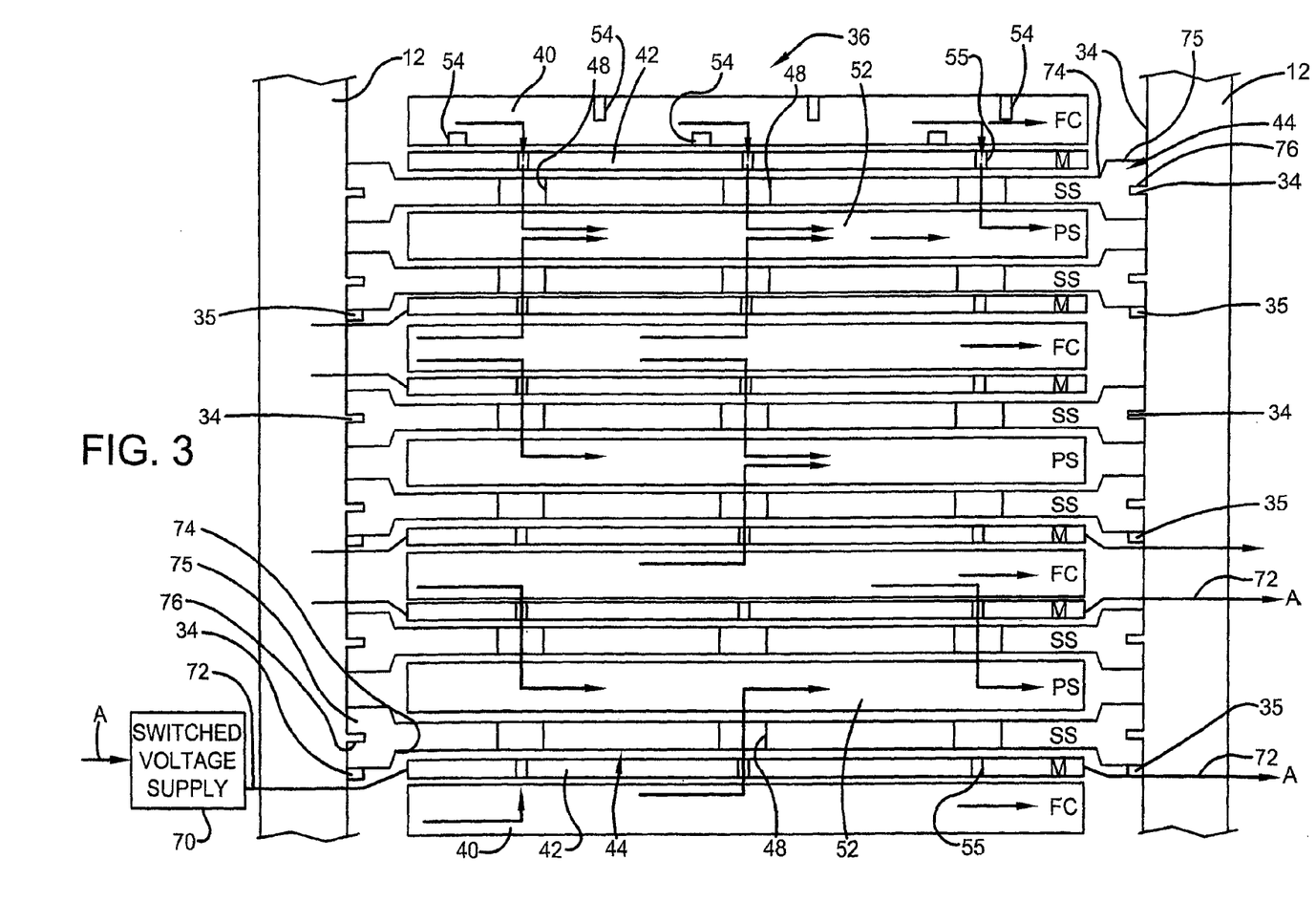
FIG. 3 is a cross-sectional and enlarged schematic view of the filtration device according to the concepts of the present invention.

Referring now to FIGS. 1-3, it can be seen that the housing 12 includes an opening 32 which extends the entire length thereof. Maintained within the housing 12 is an internal support structure which includes a series of ridges 34 and ledges 35, steps or other structural features so as to support a filtration media designated generally by the numeral 36. As seen, the internal support structure 34, 35 is provided on interior sides of the housing 12.

The filtration media 36 includes a planar layered configuration which includes at least one feed channel 40, at least one high-flux membrane 42, at least one membrane porous support structure 44, which is sometimes referred to as a porous backing, and at least one permeate spacer 52. The letter designations FC (feed channel 40), M (membrane 42), SS (support structure 44) and PS (permeate spacer 52) are provided to provide a clear designation as to each layer. It will be appreciated that although the various layers of filtration media are shown slightly spaced apart for clarity purposes, in practice the various adjacent layers are likely in touching contact with one another, with seals as appropriate between membranes, flow channels, and permeate spacers so as to provide separated flow paths between permeate and concentrate. Different positional arrangements of the aforementioned components can be utilized depending upon the components in the feedwater and how the components can best be efficiently separated or filtered from one another. As used herein, the feedwater may contain undesired constituents such as sodium, chlorine, salts, toxins, virus, bacteria, and other suspended contaminants of similar size that is carried by a fluid medium such as a solvent or water.

Generally, the feedwater is received by at least one feed channel 40 which delivers the feedwater to a high-flux membrane 42 that is supported by the support structure 44. The feed channel 40 may contain either a woven or nonwoven spacer material. The feed spacer material is constructed from a polymeric material such as polypropylene, polyethylene, polyester, polyamides, and/or fluoropolymers. Non-polymeric materials such as porous ceramics or porous sintered metals, or other materials possessing desirable hydrodynamic and application specific properties may also be used for the feed spacer material. The feed channel's physical configuration features a geometry optimized to support membrane performance and as such may have a thickness of between 0.02" to 0.04". Other embodiments may use thicknesses of between 0.02" to 0.20" for the feed channel and corresponding spacer, if used. The feed channel 40 is configured to allow the feedwater to flow from the inlet toward the outlet. Each membrane support structure 44 includes a plurality of holes 48 such that the porous support structure provides minimal flow resistance. In the present embodiment, the support structure is constructed from a polymeric material such as polycarbonate or polyester, which may be used in conjunction to comprise a laminated or composite backing structure depending on the application. Other materials with similar hydrodynamic and structural properties could be used, including carbon nanostructured materials, ceramics, and sintered porous metals. The holes 48 are sized anywhere between 15 nanometers to 200 nanometers in diameter and may be spaced apart from one another depending on hole size used. It is desirable to use backing material as open as possible to maintain a desirable flow while adequately supporting the membrane. Indeed, a structure 44 having an open area of up to 25% could be used. Other hole sizing and spacing may be used. The spacer, if used in feed channel 40, can be used to set a channel height for the feedwater to flow into and through. In some embodiments the channel height may be sized to accommodate a range of channel spacer designs to receive a mechanical mechanism 54 that generates turbulence of the feedwater prior to its entering the membrane 42. The mechanical mechanisms may include, but are not limited to, ribs or protrusions that are adjacent or integral with the feed channel 40. Turbulence may also be generated by use of a feed spacer in the form of a mesh that is constructed with ribs and spacers. An exemplary material is sold under the trade name Naltex™ by DelStar Technologies, Inc. of Middletown, Del., USA. Turbulence may also be generated by electrical mechanisms which may include, but are not limited to alternating current or direct current charge.

In the present embodiment, the high-flux membrane 42 is a graphene membrane as described in U.S. Pat. No. 8,361,321, which is incorporated herein by reference. The graphene membrane is a single-atomic-layer-thick layer of carbon atoms, bound together to define a sheet. The thickness of a single graphene membrane, which may be referred to as a layer or a sheet, is approximately 0.2 to 0.3 nanometers (nm). In some embodiments, multiple graphene layers can be formed, having greater thickness and correspondingly greater strength. Multiple graphene sheets can be provided in multiple layers as the membrane is grown or formed, and is commonly known as few layer graphene. Or multiple graphene sheets can be achieved by layering or positioning one graphene layer on top of another. For all the embodiments disclosed herein, a single layer of graphene or multiple graphene layers may be used. Testing reveals that multiple layers of graphene maintain their integrity and function, possibly as a result of self-adhesion. This improves the strength of the membrane and in some cases flow performance. The perforated graphene high-flux throughput material provides significantly improved filtration properties, as opposed to polyamide or other polymeric material filtration materials. In most embodiments, the graphene membrane is 0.5 to 2 nanometers thick. The carbon atoms of the graphene layer define a repeating pattern of hexagonal ring structures (benzene rings) constructed of six carbon atoms, which form a honeycomb lattice of carbon atoms. An interstitial aperture is formed by each six carbon atom ring structure in the sheet and this interstitial aperture is less than one nanometer across. Indeed, skilled artisans will appreciate that the interstitial aperture is believed to be about 0.23 nanometers across at its longest dimension. Accordingly, the dimension and configuration of the interstitial aperture and the electron nature of the graphene precludes transport of any molecule across the graphene's thickness unless there are perforations. This dimension is much too small to allow the passage of either water or ions.

In order to form the perforated graphene membrane, one or more perforations are made. A representative generally or nominally round aperture or perforation 55 is defined through the graphene membrane 42. Aperture 55 has a nominal diameter of about 0.6 nanometers. The six tenth nanometer dimension is selected to block the smallest of the ions which would ordinarily be expected in salt or brackish water, which is the sodium ion. The generally round shape of the aperture 55 is affected by the fact that the edges of the aperture are defined, in part, by the hexagonal carbon ring structure of the graphene membrane 42. Other aperture sizes may be selected depending upon the constituents of the feedwater and the constituents or components of the feedwater that is desired to be blocked or filtered. Accordingly, the apertures 55 may range in size from 0.5 nm to 1.2 nm in some embodiments, or from 1.0 to 10 nm in other embodiments. And in other embodiments, the size of the apertures may range from 10 nm to 100 nm.

Apertures in the graphene membrane may be made by selective oxidation, by which is meant exposure to an oxidizing agent for a selected period of time. It is believed that the aperture 55 can also be laser-drilled. As described in the publication Nano Lett. 2008, Vol. 8, no. 7, pg 1965-1970, the most straightforward perforation strategy is to treat the graphene film with dilute oxygen in argon at elevated temperature. As described therein, through apertures or holes in the 20 to 180 nm range were etched in graphene using 350 mTorr of oxygen in 1 atmosphere (atm) argon at 500° C. for 2 hours. The paper reasonably suggests that the number of holes is related to defects in the graphene sheet and the size of the holes is related to the residence time. This is believed to be the preferred method for making the desired perforations in graphene structures. The structures may be graphene nanoplatelets and graphene nanoribbons. Thus, apertures in the desired range can be formed by shorter oxidation times. Another more involved method as described in Kim et al. "*Fabrication and Characterization of Large Area, Semiconducting Nanoperforated Graphene Materials,*" Nano Letters 2010 Vol. 10, No. 4, Mar. 1, 2010, pp 1125-1131 utilizes a self assembling polymer that creates a mask suitable for patterning using reactive ion etching. A P(S-blockMMA) block copolymer forms an array of PMMA columns that form vias for the RIE upon redeveloping. The pattern of holes is very dense. The number and size of holes is controlled by the molecular weight of the PMMA block and the weight fraction of the PMMA in the P(S-MMA). Either method has the potential to produce perforated graphene sheets. Other methods of forming the apertures may be employed.

In the embodiments disclosed herein, it will be appreciated that the apertures are sized to block selected components of the feedwater and allow passage of other components. Moreover, the edges of the apertures may be modified to assist in blocking or passing of selected components. Although graphene is an exemplary two dimensional material for use as the high-flux membrane 42, skilled artisans will appreciate that other materials such as boron nitride, metal chalcogenides, silicene and germanene, and molybdenum disulfide could offer two dimensional thinness, although use of these materials for filtration applications is not known to be as ideal as graphene. In any event, the membrane 42 functions to preclude passage of unwanted components of the feedwater while allowing the desired components to pass therethrough and, accordingly through the structure holes 48. As such, by reduced operating pressure, the material not blocked by the membrane flows through the membrane apertures 55 and the membrane support structure 44 and is delivered to the permeate spacer 52. As an end result, the material blocked by the membrane continues through the feed channel 40 while the unblocked material proceeds and flows through the permeate spacer 52. In the present embodiment, the permeate spacer 52 is constructed and sized for compressive loads which will have a substantially different magnitude from those of the feed channel 40 for high pressure operation. The purpose of the permeate spacers differs as it primarily provides structural support to the membrane and does not generally serve to produce flow turbulence as does the feed spacer material if disposed in the feed channel 40. The permeate spacer also provides a conduit for permeate flow from the back side of the membrane to a common permeate collection means. Skilled artisans will appreciate that construction and sizing of the permeate spacer may be varied depending upon the characteristics of the feedwater and therefore the operating pressure and permeate flux rate.

The channels 40 and spacers 52 directly feed their respective fluids into the permeate pipe 26 (the permeate spacer 52) and the concentrate pipe 27 (the feed channel 40).

In some embodiments, the aforementioned electrical mechanism for generating turbulence is a switched voltage supply 70, which is maintained outside the housing but could be within the housing, is connected to the membrane 42 by a pair of conductors 72. The connection between the conductors 72 and switch voltage supply 70, in some instances, is shown by a capital letter A designation. In most embodiments, the conductors are attached at diametrically opposite ends of the membrane 42. As skilled artisans will appreciate, application of an electrical voltage to the membrane 42 that is graphene or has some other electrically conductive material generates a repulsive force that causes turbulence that is transmitted or transferred to the feedwater, in particular the polarized salt ions within the feedwater. In some embodiments, the forces will be alternated between repulsive and attractive to produce maximum turbulence. This turbulence assists in moving the permeate through the various layers. In the perforated graphene embodiment, the material is able to conduct an electrical charge which can be controlled to disrupt concentration polarization, thereby lowering operating pressure. Moreover, it is believed that an electrically charged graphene membrane is an ideal conductive material that will support the necessary charge to disrupt biological accumulation on the membrane surface or surrounding supporting structures. By applying a direct current or alternating current electrical charge from the supply 70 for a specified duration and then removing the charge, biological contaminants on the membrane and/or surrounding structures can be destroyed or disabled.

As skilled artisans will appreciate, the channels 40, the spacers 52, the support structure 44, and the membrane 42 are of a planar construction. In other words, each are provided with a width and length which receives the feed supply and the filtered fluid.

In the present embodiment the support structure 44, along with the membranes 42 which they support, are removable from the housing by virtue of their retention by the internal support structure 34. The support structure 44 includes a lateral edge 74 along each side that provides a handle 75. Each handle 75 includes a groove 76. Each groove 76 is slidably receivable on a corresponding ridge 34. Additionally, an underside of each handle 75 may be slidably received on and supported by a corresponding ledge 35. The support structure 44 can be mechanically fastened to the internal support structure—ridges 34, ledges 35—to maintain pressure during operation. Unfastening of the support structures allows access to the membranes located inside the housing.

In the embodiment shown in FIG. 3, the uppermost support structure 44 supports a membrane 42. The feedwater flows through the membrane 42 via the apertures 55 and the membrane support 44 via the holes 48 and is received by the permeate spacer 52. Disposed on the underside of that particular permeate spacer 52 is another support structure 44 which has on its other side another membrane 42. Another feed channel 40 is disposed adjacent that membrane. As such, any feedwater that enters one of the inner feed channels 40 may enter a membrane 42 immediately above or immediately below wherein the material that flows therethrough enters the appropriate permeate spacer 52. A feed spacer material may be used to keep the membranes separated from each other. Flow through the device moves from input side to output side down the length of the housing, with permeate flow moving down the permeate channel and feedwater flow moving down the feedwater channel, tangential to the membrane surface. This direction is in and out of the page as viewed in FIG. 3. The directional arrows provided in FIG. 3 (and later in FIG. 4) are for the purpose of showing how the feedwater flows from one layer to another. As can be seen by viewing the filtration media 36, each support structure 44 is associated with a membrane 42 on one side thereof and an appropriate permeate spacer 52 on an opposite side. This stacked planar design is conducive for replacing membranes as needed.

The filtration media 36 is configured to optimize the relationship of the various layers with one another. As such, each feed channel 40 has at least one membrane on one side thereof, and in some instances both sides. Each permeate spacer 52 has a support structure 44 on both sides thereof. Finally, each membrane is positioned between a support structure 44 on one side and a feed spacer on an opposite side. The filtered material that collects in the permeate spacer 52 then flows out the housing through the permeate pipe 26. The unfiltered or blocked material that remains in the feed channel flows out the housing through the concentrate pipe 29.

It will also be appreciated that adjacent layers could be specifically associated with one another. For example, a layered sequence of a membrane 42, a support structure 44, a permeate spacer 52, another support structure and another membrane 42 could be configured so as to form a membrane leaf structure. The leaf structure could be a replaceable unit and could be removed and replaced if found defective. The associated support structures could be secured to one another to facilitate insertion and removal.

The filtration device 10 has several readily apparent advantages. By utilizing ultra thin or two-dimensional materials, a layered plate design is able to be obtained instead of a spiral wound design. In the case of an ultra-permeable membrane such as perforated graphene, the layered plate design can be utilized at reduced overall size compared to current state of the art filtration devices while maintaining the benefits of linear scalability, membrane accessibility, and channel design to mitigate the effects of concentration polarization, scaling fouling and the like. Indeed, use of a high flux throughput material, such as perforated graphene or the like, allows for a reduction in membrane surface area by a factor of anywhere between five to fifty times. The present embodiments are also advantageous in that they increase the ease of assembly and reduce manufacturing requirements by use of the removable support structures, spacers and membranes. Still yet another advantage of the filtration device 10 is that it allows for multiple devices to be attached in series to provide additional filtering as needed.

Figure 4:
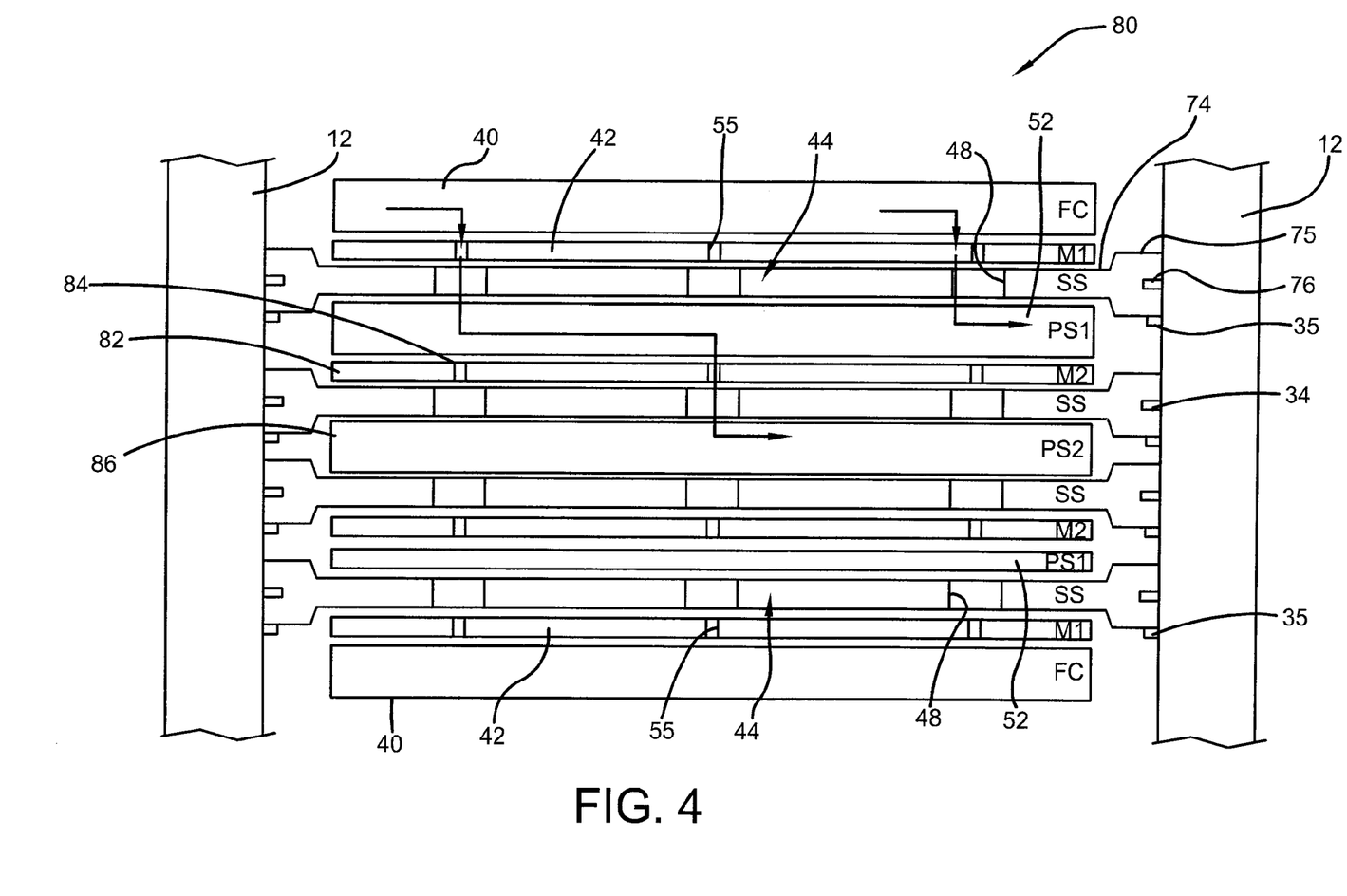
FIG. 4 is a cross-sectional and enlarged schematic view of an alternative filtration device according to the concepts of the present invention.
Figure 5:
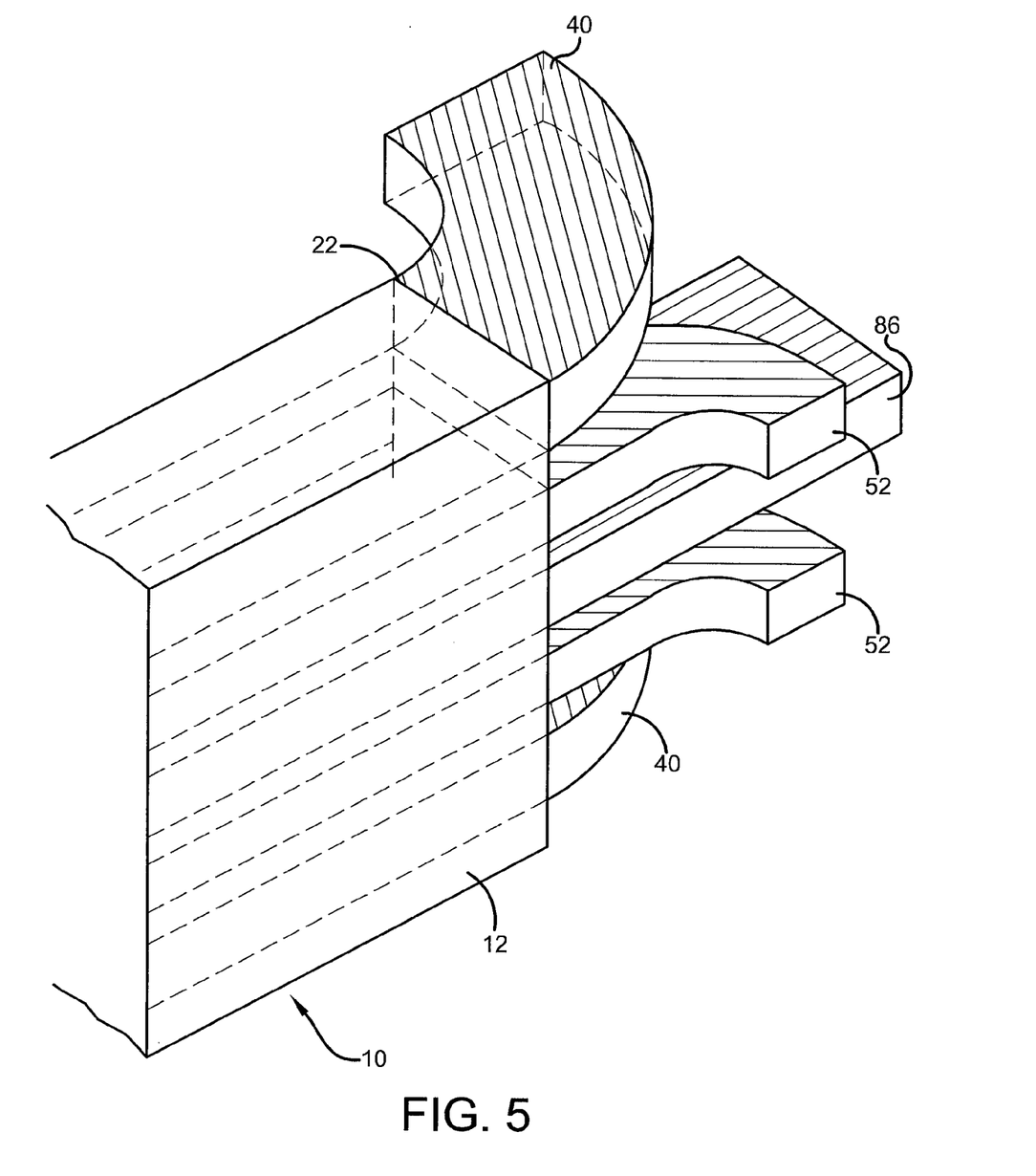
FIG. 5 is a schematic view of an outlet cap to separate two or more output streams from the filtration device with a planar membrane arrangement.

Referring now to FIGS. 4 and 5, an alternative embodiment of a filtration device having a filtration media designated generally by the numeral 80 is shown. The media 80 is receivable in the housing 12 and receives feedwater input in substantially the same way as shown in FIG. 1. The output of the filtration media 80 is different and will be described in relation to FIG. 5. In any event, the filtration media is a layered planar construction very similar to that shown in FIG. 3, but with several new components. As in the previous embodiment, the filtration media includes a feed channel 40 (FC) and a high-flux membrane 42 (M1) having a plurality of apertures 55.

A support structure 44 (SS) carries the membrane 42 and the feed channel 40, which may include a spacer material, and, in a manner similar to the previous embodiment, the structure 44 provides for a plurality of holes 48. Each support structure 44 provides a handle 75 at each side edge 74 of the support structure which is sized large enough for grasping by a technician. Each handle 75 has a groove 76 so as to be slidably movable along the ridge 34 extending inwardly from a wall of the housing. Each handle may be supported by a ledge 35. The support structure is sized so as to easily carry the membrane and the feed spacer and allow for their removal, if required, from the support structure. Positioned underneath the support structure is a permeate spacer 52 (PS1). The layers in the media 80 are substantially the same as that disclosed for the media 36.

For the filtration media 80, additional layers are provided. These include another high-flux membrane 82 (M2) which has a plurality of apertures 84 which are sized to be smaller than the apertures 55 of the high-flux membrane 42. Another support structure 44 is positioned immediately underneath the membrane 82. Positioned underneath this particular support structure is another permeate spacer 86 (PS2). The remaining structure of the filtration media is a mirror opposite of the just described variation. In other words, positioned underneath the second support structure 44 and the permeate spacer 86 is another support structure which has on its underside a membrane 82, another permeate spacer 52, a support structure 44, a membrane 42 and a feed channel 40. In a manner similar to the previous embodiment, a leaf structure can be formed by the layered sequence shown or some variation thereof to allow for replacement.

Skilled artisans will appreciate that the layered construction shown in FIG. 4 may be repeated any number of times so as to filter the feedwater material. In the embodiment shown the filtration media is utilized to separate out two components from the feedwater, fluid medium or other material. For example purposes only, the shown configuration may be utilized to desalinate salt water. Accordingly, the feedwater which contains water molecules, monovalent ions and divalent ions is provided to the feed channels 40. The feedwater flows through the feed channels, and spacer material if provided, and is projected onto the membranes 42. The apertures 55 of the membrane 42 are sized so as to preclude or block the flow of divalent ions. As such, the apertures may be sized to about a dimension of about 1.4 nm or in a range of between 1.2 to 1.6 nm. Accordingly, the water molecules and monovalent ions are permitted to flow through these apertures while the divalent ions are blocked. These divalent ions and remaining components that do not flow through the apertures 55 continue through the feed channels and to the outlet of the housing. The water molecules and monovalent ions that flow through the support structure apertures 44 are then received by the permeate spacers 52 and flow toward the membrane 82. The membrane 82 provides apertures 84 that are sized to block the monovalent ions and, in the present embodiment, the apertures are believed to have a diameter of about 0.9 nm. In some embodiments, the apertures may range in size from 0.8 to 1.2 nm. Accordingly, these apertures are adequate to allow for the passage of the water molecules but preclude migration of the monovalent ions. Accordingly, the monovalent ions flow along the permeate spacers 52 along with any water molecules that do not flow through the apertures 84 and are received in the appropriate outlet for further processing. The material not blocked by the membrane 82, the purified water molecules, flows into the permeate spacer 86 and likewise flows to the outlet for further processing.

As best seen in FIG. 5, the device 10 provides the housing 12 along with a plurality of outputs. In particular, the housing 12 provides for extension of the feed channel 40 which carries the materials blocked by the membrane 42 and routes the feed channels 40 into an appropriate outlet or conduit for further processing. In a similar manner, the permeate spacers 52 carry the monovalent ions and presumably a number of water molecules to an appropriate outlet for further processing. Finally, the permeate spacer 86 carries the water molecules which are free of the salt ions and can be used for the appropriate end-use. The embodiment shown in FIGS. 4 and 5 is advantageous in that multiple components of a feedwater can be separated and processed. This is useful for when multi-components are included in the feedwater and it will be appreciated that the layering concept utilizing the support structures can facilitate filtering of any number of components from a fluid or gaseous medium. It will also be appreciated that membrane leafs and corresponding components can be replaced as needed if they are damaged or otherwise rendered inoperative. Moreover, the aperture sizes of the membranes can be adjusted as needed for a particular feedwater material. Although the embodiments shown in FIGS. 4 and 5 outputs three components, the layered filtration components can be scaled so as to increase the number of constituents provided in a feedwater supply. In other words, by incorporating high-flux membranes that have different aperture sizes, any number of constituents can be removed.

Figure 6:
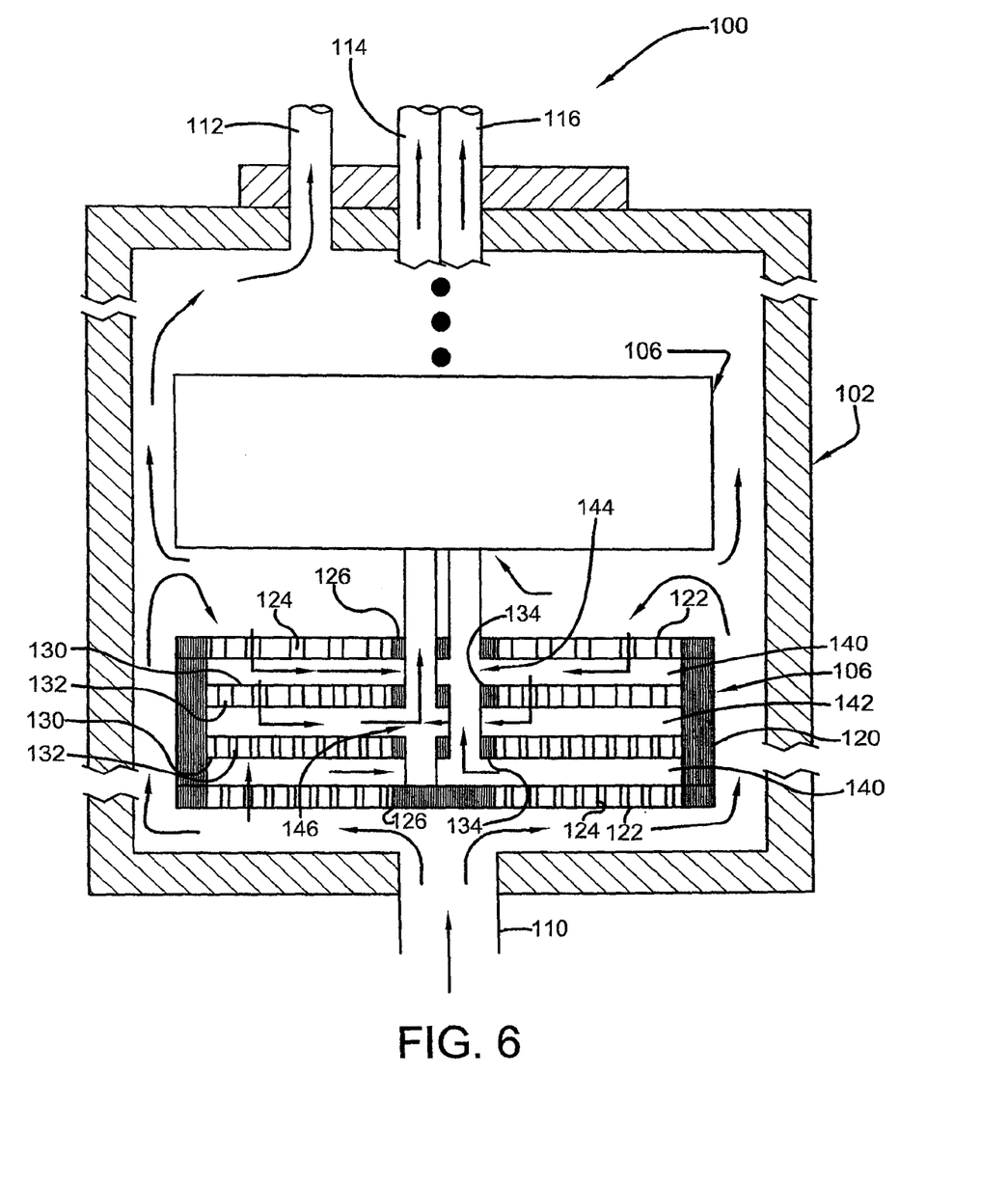
FIG. 6 is a cross-sectional and enlarged schematic view of another alternative filtration device according to the concepts of the present invention.

Referring now to FIG. 6, it can be seen that an alternative filtration device is designated generally by the numeral 100. The device 100 provides for a housing 102 and at least one filtration media designated generally by the numeral 106. In this particular embodiment, instead of employing a planar rectangular filtration media, it will be appreciated that the filtration media is configured in planar circular discs which allow for a more direct collection of the filtered materials. The housing 102 provides for a single inlet 110, although multiple inlets could be provided, as long as the same material enters the housing 102. The housing 102 also provides an outlet 112 utilized to direct the unfiltered concentrate from the feedwater. As noted previously, the concentrate is any material that has not processed through the filters as will be described. The housing also includes a permeate conduit 114 and a permeate conduit 116. Both the conduits 114 and 116 are provided to axially extend through the filtration media and out from the housing 102. The conduits 114 and 116 are sealed so as to prevent direct entry of the feedwater. In this embodiment, the conduits 114 and 116 provide the internal support structure for carrying the filtration media.

The filtration media 106 provides for a circular outer band 120 which serves as a membrane support structure and precludes the flow of material through the bands so as to not enter the areas between the membranes as will be discussed. The membranes in this embodiment have the same properties and characteristics as disclosed in the previous embodiments. And, as in the previous embodiments, the media 106 may be utilized to separate and/or filter any multi-component feedwater. Captured by the inner surfaces of the outer band 120 are a pair of opposed and spaced apart end membranes 122. The outer diameter of each end membrane 122 is captured and sealed by the outer band 120. Each membrane 122 provides for a plurality of apertures which are sized to block the selected ions. As discussed in the previous embodiment for desalination, the membranes will as one example be utilized to block divalent ions that will flow through the housing 102 with all other rejected material and then exit out the outlet 112.

A central hub 126 is provided by each end membrane 122 so as to preclude direct entry of feedwater into the conduits 114 and 116. One of the hubs 126 will have openings therethrough to receive and carry the conduits 114 and 116. Disposed between the two end membranes are a pair of spaced apart inner membranes 130. Each inner membrane has an outer diameter that is securely received by the band 120. The inner membranes 130 have a plurality of apertures 132 which are configured so as to block the monovalent ions and allow for the water molecules to pass therethrough in the same manner as in the previous embodiment. The inner membranes are also provided with inner hubs 134 that receive and carry the conduits 114 and 116 so as to allow for passage of the selected ions and preclude passage of the non-selected ions and other debris. To support the membranes, a permeate spacer 140 may be disposed between a respective end membrane and an inner membrane. In a similar manner, a permeate spacer 142 may be disposed between the inner membranes 130. The permeate conduit 116 provides conduit openings 144 disposed between the end and inner membranes. In a similar manner, the permeate conduit 114 provides conduit openings 146 between the inner membranes.

Accordingly, in operation the feedwater material is projected into the housing and comes in contact with the end membranes 122. Those materials sized to pass through the apertures 124 do so accordingly, while the material that is too large to fit through the apertures continues on through the housing and exits out the outlet 112. Once the material passes through the end membranes it encounters the inner membranes 130. If the material is too large, it will be received and pass through the conduit openings 144 and flow through the conduit 116. If the material is small enough to fit through the apertures 132 of the inner membranes 130, then the filtered material is received and passes into the conduit openings 146 and flows through the conduit 114.

This embodiment is advantageous in that it allows for the conduits to be centrally located and thus facilitate attachment to various collection vessels. This embodiment also allows for the media 106 to be removed from the housing 102 and for the membranes 122, 130 to be cleaned and/or replaced as needed.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A filtration or selective fluidic isolation and recovery device, comprising:
    a housing having an inlet and an outlet, said housing having an opening extending from said inlet to said outlet;
    an internal support structure maintained in said opening; and
    at least one planar filtration media having a planar layered construction carried by said internal support structure, said filtration media comprising
    a first of a first type of planar permeate spacer, one of a second type of planar permeate spacer and a first feed channel;
    a first of a first type of planar membrane having apertures sized to block a first component of a feedwater and a first of a second type of planar membrane having apertures sized to block a second component of the feedwater wherein the aperture size of the first type of planar membrane is greater than the aperture size of the second type of planar membrane and said first type of planar membrane and said second type of planar membrane are constructed of a perforated two-dimensional material; and
    a first membrane support structure associated with said first of said first type of planar membrane and a second membrane support structure associated with said first of said second type of planar membrane;
    wherein said first of said first type of planar membrane is positioned between said first feed channel and said first membrane support structure, said first of said first type of planar permeate spacer is positioned adjacent said first membrane support structure, said first of said second type of planar membrane is positioned between said first of said first type of planar permeate spacer and said second membrane support structure, and said one of said second type of planar permeate spacer is positioned adjacent a side of said second membrane support structure opposite said first of said second type of planar membrane;
    and wherein the filtration media further comprises
    a second of said first type of planar membrane and a second of said second type of planar membrane;

a second feed channel;
a second of said first type of planar permeate spacer; and
a third membrane support structure and a fourth membrane support structure, the third membrane support structure associated with said second of said first type of planar membrane and the fourth membrane support structure associated with said second of said second type of planar membrane;

wherein said one of said second type of planar permeate spacer is positioned adjacent a side of said fourth membrane support structure opposite said second of said second type of planar membrane, said second of said second type of planar membrane is positioned between said second of said first type of planar permeate spacer and said fourth membrane support structure, said second of said first type of planar permeate spacer is positioned adjacent said third membrane support structure and said second of said first type of planar membrane is positioned between said second feed channel and said third membrane support structure;

each of said membrane support structures is porous, has a planar portion, is carried by said internal support structure and is removable from said housing for cleaning, servicing or replacement;

said filtration media separating feedwater received at said inlet into at least a first permeate, a second permeate and a concentrate that separately exit at said outlet.

2. The device according to claim 1, wherein each of said first and said second of said first type of planar membrane is a perforated graphene membrane and each of said first and said second of said second type of planar membrane is a perforated graphene membrane.

3. The device according to claim 1, further comprising:
an outlet cap associated with said outlet, said outlet cap having:
a first permeate pipe associated with said first and said second of said first type of planar permeate spacer to collect said second component of feedwater;
a second permeate pipe associated with said one of said second type of planar permeate spacer to collect components of feedwater not blocked by said first and said second of said first type of planar membrane and by said first and said second of said second type of planar membrane; and
a concentrate pipe associated with said first and second feed channel to collect said first component of feedwater.

4. The device according to claim 1, wherein said filtration media having a planar layered construction is configured for selective isolation and recovery of desired particulates, solutes, or analytes, as opposed to filtering out unwanted particulates, solutes, or analytes for two or more concentrate streams.

5. The device according to claim 1, wherein each of said first and said second of said first type of planar membrane and each of said first and said second of said second type of planar membrane is constructed from a perforated material selected from the group consisting of graphene, boron nitride, metal chalcogenides, silicone, germanene, and molybdenum disulfide.

6. The device according to claim 1, wherein each of said first and said second of said second type of planar membrane has apertures sized from 0.5 to 1.2 nm.

7. The device according to claim 1, wherein each of said first and said second of said first type of planar membrane has apertures sized from 1.0 to 10 nm.

8. The device according to claim 1, wherein each of said first and said second of said first type of planar membrane has apertures sized to block divalent ions and each of said first and said second of said second type of planar membrane has apertures sized to block monovalent ions.

9. The device according to claim 1, wherein each of said first and said second of said first type of planar membrane has apertures sized between 1.2 nm to 1.6 nm and each of said first and said second of said second type of planar membrane has apertures sized from 0.8 nm to 1.2 nm.

10. The device according to claim 1 wherein the filtration media has a stacked planar design and comprises a sequence of:
said first feed channel adjacent to and in contact with;
said first of said first type of planar membrane further adjacent to and in contact with;
said first membrane support structure further adjacent to and in contact with;
said first of said first type of planar permeate spacer further adjacent to and in contact with;
said first of said second type of planar membrane further adjacent to and in contact with;
said second membrane support structure further adjacent to and in contact with;
said one of said second type of planar permeate spacer further adjacent to and in contact with;
said fourth membrane support structure further adjacent to and in contact with;
said second of said second type of planar membrane further adjacent to and in contact with;
said second of said first type of planar permeate spacer further adjacent to and in contact with;
said third membrane support structure further adjacent to and in contact with;
said second of said first type of planar membrane further adjacent to and in contact with;
said second feed channel.

11. A filtration or selective fluidic isolation and recovery device, comprising:
a housing having an inlet and an outlet, said housing having an opening extending from said inlet to said outlet;
an internal support structure maintained in said opening; and
at least one planar filtration media carried by said internal support structure,
wherein said planar filtration media comprises:
a pair of spaced apart end membranes, each said end membrane being a first type of planar membrane and each said end membrane having an outer diameter coupled to said internal support structure;
a pair of spaced apart inner membranes, each said inner membrane being a second type of planar membrane and each inner membrane having an outer diameter coupled to said internal support structure;
wherein said first type of planar membrane and said second type of planar membrane having apertures are constructed of a perforated two-dimensional material and the aperture size of said first type of planar membrane is greater than the aperture size of said second type of planar membrane; and
a first and a second of a first type of planar permeate spacer disposed between each of said pair of inner membranes and adjacent each end membrane and one of a second type of planar permeate spacer disposed between said pair of inner membranes;

and wherein said internal support structure comprises: a first and a second outlet conduit, wherein said second outlet conduit has openings adjacent said one of said second type of planar permeate spacer and said first outlet conduit has openings adjacent said each of said first and said second of said first type of planar permeate spacer, said filtration media separating feedwater received at said inlet into at least a first permeate, a second permeate and a concentrate that separately exit at said outlet.

12. The device according to claim 11, wherein each of said first and said second of said first type of planar membrane and each of said first and said second of said second type of planar membrane is constructed from a perforated material selected from the group consisting of graphene, boron nitride, metal chalcogenides, silicone, germanene, and molybdenum disulfide.

13. The device according to claim 11 wherein each of said first and said second of said first type of planar membrane and each of said first and said second of said second type of planar membrane is constructed from perforated graphene material.

14. The device according to claim 11, wherein the apertures of each of said first and said second of said first type of planar membrane is configured to block divalent ions and the apertures of each of said first and said second of said second type of planar membrane is configured to block monovalent ions and allow water molecules to pass therethrough.

15. The device of claim 11, wherein each of said first and said second of said first type of planar membrane has apertures sized from 1.2 to 1.6 mm and each of said first and said second of said second type of planar membrane has apertures sized from 0.8 nm to 1.2 nm.

16. The device of claim 11, wherein the planar filtration media has a stacked planar design and comprises a sequence of:

one of said pair of end membranes adjacent to and in contact with;

said first of a first type of planar permeate spacer further adjacent to and in contact with;

one of said pair of inner membranes further adjacent to and in contact with;

said one of said second type of planar permeate spacer further adjacent to and in contact with;

the other of said pair of inner membranes further adjacent to and in contact with said second of a first type of planar permeate spacer further adjacent to and in contact with;

the other of said pair of end membranes.

* * * * *